(12) United States Patent
Christopher et al.

(10) Patent No.: US 11,897,059 B2
(45) Date of Patent: Feb. 13, 2024

(54) CURRENT LIMITING SECONDARY CONTACT

(71) Applicant: Illinois Tool Works Inc., Glenview, IL (US)

(72) Inventors: Mark Richard Christopher, Neenah, WI (US); John Walter Lundin, Appleton, WI (US)

(73) Assignee: Illinois Tool Works Inc., Glenview, IL (US)

( * ) Notice: Subject to any disclaimer, the term of this patent is extended or adjusted under 35 U.S.C. 154(b) by 956 days.

(21) Appl. No.: 16/283,367

(22) Filed: Feb. 22, 2019

(65) Prior Publication Data

US 2019/0262926 A1    Aug. 29, 2019

Related U.S. Application Data

(60) Provisional application No. 62/635,208, filed on Feb. 26, 2018.

(51) Int. Cl.
| | |
|---|---|
| *B23K 9/067* | (2006.01) |
| *B23K 9/073* | (2006.01) |
| *B23K 9/10* | (2006.01) |

(52) U.S. Cl.
CPC ............ *B23K 9/067* (2013.01); *B23K 9/0731* (2013.01); *B23K 9/1093* (2013.01)

(58) Field of Classification Search
CPC ..... B23K 9/067; B23K 9/0731; B23K 9/1093
USPC .............. 219/130.4, 130.51, 137 PS, 137.71, 219/130.31, 136
See application file for complete search history.

(56) References Cited

U.S. PATENT DOCUMENTS

| | | | | |
|---|---|---|---|---|
| 3,049,609 A | * | 8/1962 | Purkhiser | B23K 9/0731 219/137.71 |
| 3,826,888 A | * | 7/1974 | Garfield | B23K 9/0213 219/136 |
| 4,584,458 A | * | 4/1986 | Tremblay | B23K 9/0731 219/137.71 |
| 5,148,001 A | * | 9/1992 | Stava | B23K 9/0732 219/130.1 |
| 5,343,017 A | * | 8/1994 | Karino | B23K 9/0731 219/130.4 |
| 6,849,828 B2 | * | 2/2005 | Aigner | H02M 7/5236 219/130.21 |
| 8,389,899 B2 | * | 3/2013 | Natta | B23K 9/323 219/136 |

(Continued)

OTHER PUBLICATIONS

Int'l Search Report and Written Opinion Appln No. PCT/US2019/019526 dated Aug. 9, 2019.

*Primary Examiner* — Nathaniel E Wiehe
*Assistant Examiner* — Ket D Dang
(74) *Attorney, Agent, or Firm* — McAndrews, Held & Malloy, Ltd.

(57) ABSTRACT

A welding-type system includes a welding torch comprising a contact tip to provide an electrode wire. A secondary contact in electrical contact with the electrode wire, the secondary contact located along a length of the electrode wire and before the contact tip. Each of the contact tip and the secondary contact are connected to a welding-type power source. A current limiting device coupling located between the welding-type power source and the secondary contact and configured to limit a current at the secondary contact.

20 Claims, 3 Drawing Sheets

(56) References Cited

U.S. PATENT DOCUMENTS

| | | | |
|---|---|---|---|
| 2007/0051711 A1* | 3/2007 | Kachline | B23K 9/28 |
| | | | 219/130.01 |
| 2012/0199560 A1* | 8/2012 | Era | B23K 9/173 |
| | | | 219/74 |
| 2014/0021183 A1* | 1/2014 | Peters | B23K 9/295 |
| | | | 219/130.51 |
| 2014/0097164 A1* | 4/2014 | Beistle | B23K 9/1012 |
| | | | 219/130.33 |
| 2014/0367370 A1* | 12/2014 | Hutchison | B23K 9/1062 |
| | | | 219/130.33 |
| 2015/0251275 A1* | 9/2015 | Denney | B23K 26/322 |
| | | | 219/121.64 |
| 2017/0225255 A1 | 8/2017 | Zwayer | |

* cited by examiner

CURRENT LIMITING SECONDARY CONTACT

This application claims priority from and the benefit of U.S. Provisional Application Ser. No. 62/635,208, entitled "CURRENT LIMITING SECONDARY CONTACT," filed Feb. 26, 2018, which is hereby incorporated by reference in its entirety for all purposes.

The present disclosure relates generally to systems and methods employing arc welding torches and consumable electrode wires. In particular, the systems and methods prevent wire from unintentional arcing and melting on a welding torch contact tip during arc initiation by incorporating a current limiting device at a secondary contact point. Thus, the presently disclosed systems and methods address the problem of "burn back" during arc initiation on small diameter wires, such as softer electrode materials including aluminum.

BACKGROUND

Wire liners are often used in welding torches to create a weld from relatively hard wires, such as wires made of steel, stainless steel and nickel alloys. Liners employed with such hard wires are typically also made of a hard wire wound material, such as steel or a stainless steel alloy. However, the use of liners comprising a hard wire wound material may be unsuitable for welding processes employing a softer electrode wire, such as aluminum. Thus, systems and methods that address the issues associated with hard wire wound material liners and aluminum electrodes is desirable.

BRIEF DESCRIPTION OF THE DRAWINGS

The figures are not necessarily to scale. Where appropriate, similar or identical reference numbers are used to refer to similar or identical components.

DETAILED DESCRIPTION

Figure 1:
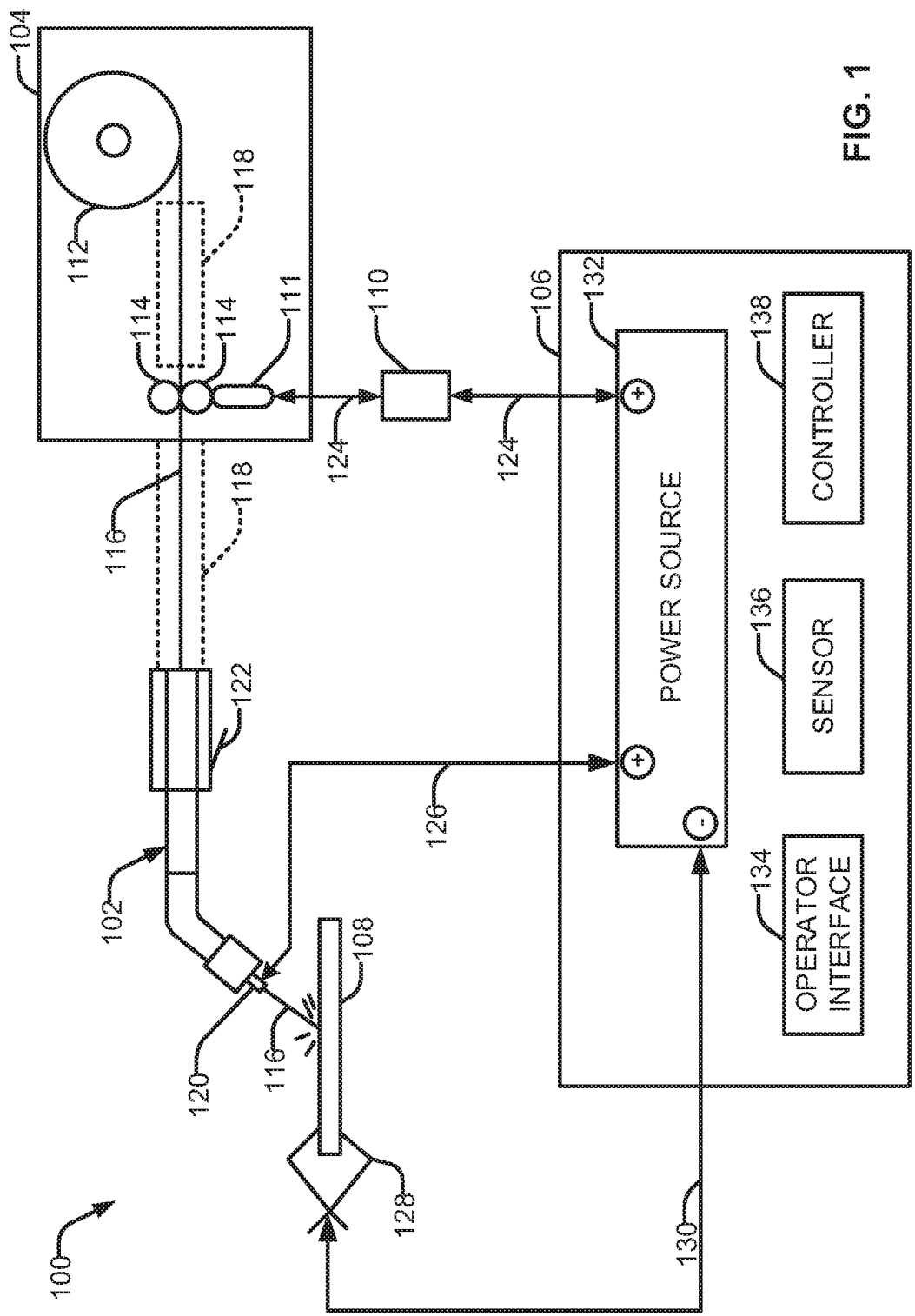
FIG. 1 depicts an example welding system employing a current limiting device, in accordance with aspects of this disclosure.

Examples of the present disclosure are described with respect to a welding system that includes a spool of weld wire (e.g., a welding-type electrode), a liner comprising a non-conductive, softer material (e.g., plastic), drive rolls to feed the wire, a torch, and a voltage source. The torch includes a trigger and a contact tip, and is connected to a potential of the weld voltage, whereas a work piece is connected to the opposite potential. A current limiting device is positioned between the weld voltage and a secondary contact to the weld wire, allowing the current pick-up to maintain the weld voltage on the wire without allowing enough current flow to create an arc. Thus, the examples disclosed herein advantageously mitigate effects from "burn back," or unintentional arcing, in a welding-type operation.

For instance, if hard wire wound liners are employed with a torch using a relatively soft wire (e.g., aluminum), the soft wire material can be scraped off as the wire travels through the hard wound liners towards the torch's contact tip. The resulting scraped off wire can negatively affect a wire feeder's ability to feed the wire though the torch and contact tip, as the scraps can become welded to the contact tip or other portion of the torch, become lodged in the liner, etc. As a result, many welding-type torches (e.g., gas metal arc welding (GMAW) torches) designed to create welds from soft wires like aluminum tend to use a relatively softer liner, such as made of plastic.

Although soft plastic liners cause less scraping on an aluminum wire, unlike the metal wound liners, plastic and other non-metallic (i.e. non-conductive) liners cannot maintain the same voltage as the voltage of the contact tip (e.g., weld voltage), which can negatively affect welding with softer wires. As result of welding with plastic liners, if the welding wire temporarily loses contact with the contact tip, the welding wire will match the associated work piece's voltage potential. When the welding wire re-establishes contact with the contact tip, an arc is generated between the welding wire and the contact tip due to resulting the voltage difference. This arc can cause the soft wire to hesitate, and cause an effect termed "burn back" to occur at the contact tip (i.e. forming a weld with the contact tip). This condition can prevent the welding wire from passing through the contact tip, can damage the contact tip, frustrate the weld, and/or require additional steps to continue a desired weld process.

To address the burn back effect, secondary contacts can be added to welding-type torches that employ soft weld materials (e.g., aluminum) in order to maintain the voltage of the weld wire at the same level as the contact tip. For example, during a weld operation, the voltage between the contact tip and wire can be closely matched, even when the weld wire is not in contact with the contact tip. As a result, when a secondary contact tip is used, occurrence of an arc is prevented when the soft weld wire re-establishes contact with the contact tip.

An example secondary contact includes a relatively long piece of metal liner that is kept at the weld voltage, located between the spool of welding wire and the contact tip. In this configuration, the metal liner tends to scrape the welding wire, which causes shavings of the soft welding wire to build up, resulting in burn back. Because the metal liner maintains greater contact with the wire, the current per area of the metal liner is kept relatively low.

A shorter secondary contact would result in limited contact with the welding wire, and may at times lose contact with the welding wire altogether. For example, loss of contact is most likely to occur while the contact tip is removed (e.g., during replacement of the contact tip). In the event that the torch is accidently triggered while changing a contact tip, head tube, etc., the welding wire can lose contact with the secondary current element. The welding wire would then match a potential at the work voltage, making the secondary current element pick up at the level of the weld voltage. Thus, when the welding wire again makes contact with the contact tip, an arc will occur.

Another example secondary contact is achieved by maintaining a wire drive roll at the weld voltage level. The contact region between the drive roll and the wire being fed from the drive roll is not significantly greater than the line of contact formed between the contact tip and the welding wire, for instance. As a result, the current per area at the contact between the wire and drive roll is quite high. Thus, this high current per area generates an arc at the surface of the drive roll each time the wire loses contact with the contact tip. Continued arcing in this manner may eventually cause damage to the drive roll, leaving a depression in the drive roll great enough such that the drive roll can no longer feed wire consistently.

To address these issues, a system with a modular design for easy replacement and/or repair of weld cables and welding-type torches, designed to prevent arcing between the work piece and the wire, the contact tip and the wire, etc., during replacement and/or repair of the contact tip, is highly desirable. Thus, examples disclosed herein provide a solution to the issue of secondary contact pick-ups being arced by weld wire.

For instance, the voltage of the secondary contact is kept at weld voltage and the current allowed to pass through the secondary contact is limited such that an arc does not occur on the secondary contact, even while changing the contact tip. This is achieved by adding a current limiting device, such as a resistor, capacitor, and/or diode, between the weld voltage and the secondary contact.

Advantageously, by contrast to conventional systems, the presently disclosed system has multiple benefits, such as limiting of current during replacement or repair of parts, and/or accidental break in the electrode path, which will improve welding system performance.

As used herein, the term "welding-type power" refers to power suitable for welding, plasma cutting, induction heating, CAC-A and/or hot wire welding/preheating (including laser welding and laser cladding). As used herein, the term "welding-type power supply" refers to any device capable of, when power is applied thereto, supplying welding, plasma cutting, induction heating, CAC-A and/or hot wire welding/preheating (including laser welding and laser cladding) power, including but not limited to inverters, converters, resonant power supplies, quasi-resonant power supplies, and the like, as well as control circuitry and other ancillary circuitry associated therewith.

As used herein, the term "wire feeder" includes the motor or mechanism that drives the wire, the mounting for the wire, and controls related thereto, and associated hardware and software. The term "drive the wire" includes one or both of moving the wire toward the torch and moving the wire away from the torch.

As used herein, the term "welding system," or system for providing welding power, as used herein, includes one or more of a power source, controller, wire feeder, and a source of gas, it may also include peripherals such as robots etc., that cooperate to provide welding power.

As used herein, the terms "torch," "welding-type tool" or "welding torch" refers to a torch, gun, or other device used to create an arc with the workpiece, and can include a hand-held or robotic welding torch.

As used herein, the term "controller" or "control circuitry" includes digital and/or analog circuitry, discrete or integrated circuitry, microprocessors, DSPs, FPGAs, etc., and/or software, hardware and firmware, located on one or more boards, used to control all or part of a welding-type system or a device such as a power supply, power source, wire feeder, engine or generator.

As used herein, a "circuit" or "circuitry" includes any analog and/or digital components, power and/or control elements, such as a microprocessor, digital signal processor (DSP), software, and the like, discrete and/or integrated components, or portions and/or combinations thereof.

As used herein, the term "energy storage device" is any device that stores energy, such as, for example, a battery, a super capacitor, etc.

As used herein, the term "memory" includes volatile and non-volatile memory, and can be arrays, databases, lists, etc.

As used herein, the term "welding mode" or "welding process" is the type of process or output used, such as CC, CV, pulse, GMAW, MIG, TIG, spray, short circuit, etc.

FIG. 1 illustrates an example welding system 100 employing a current limiting device(s) 110. As shown, the welding system 100 includes a welding-type torch 102 having a trigger 122 and a contact tip 120 to provide an electrode wire 116 to perform a weld on a workpiece 108. The welding system 100 includes a wire feeder 104 having a spool 112 of welding-type electrode wire 116. A non-conductive liner 118 (e.g., plastic and/or other materials softer than steel or other hard metals) channels and/or protects the wire 116, as wire feeder rolls 114 drive the wire 116 to the welding-type torch 102. As shown, the liner 118 can be located within the wire feeder 104 and/or external to the wire feeder 104, such as part of a cable connecting the wire feeder 104 to the torch 102. A welding-type power supply 106 includes a power source 132, a controller 138, an interface 134, and/or a sensor 136.

In the example of FIG. 1, the current limiting device 110 is coupled between the drive rolls 114 and the power source 132. A secondary contact 111 is in electrical contact with the drive rolls 114, such as by a brush, bushing, or other suitable electrical contact component. The current limiting device 110 is configured to maintain a voltage at a secondary contact 111 at the weld voltage level, while limiting the available current through the secondary contact 111 to ensure arcing does not occur. The current limiting device 110 can be configured to limit current when a power characteristic (e.g., a voltage level) exceeds a threshold level. This can be achieved by use of current limiting electronic components, such as resistors, capacitors, diodes, etc.

Although illustrated as coupling the wire feeder 104 and the power supply 106 along conductor 124, the current limiting device 110 can additionally or alternatively be located within either the wire feeder 104 or the power supply 106.

In examples, the current limiting device 110 can include passive controls, such as resistors, capacitors and diodes, to perform the current limiting function. Additionally or alternatively, active controls such as a switch (e.g., a transistor) can be employed to actively manage the current flowing through the system 100. Thus, the current flowing to the wire 116 is limited by the response of the current limiting device 110. In other words, the device 110 is designed to limit current from the power source 132 if one or more threshold voltage values are violated. Moreover, the current limiting device 110 can be multiple devices/circuits, can be configured to respond to different values (e.g., each configured to respond to multiple and/or different threshold values), and can limit current by different amounts (e.g., by employing resistors, capacitors, diodes, etc., with different ratings) in accordance with a desired operation (e.g., welding process).

In an example, a semi-conductive material is employed in the current limiting device/circuit 110 between the welding type voltage source 132 and the secondary contact element 111. The semi-conductive material is of a shape and size to provide a low enough resistance to maintain the weld voltage on the wire 116 without allowing current flow sufficient to create an arc, such as in response to an open voltage condition between the contact tip 120 and the wire 116.

In an example, a sensor(s) 136 can monitor a power characteristic (e.g., voltage, current, resistance, impedance, conductance, temperature, etc.) at the contact tip 120, the workpiece 108, and/or at the secondary contact 111. The controller 138 can receive information regarding the power characteristics and determine if a disparity of power characteristic levels (e.g., voltage) exists, such as by referencing a list of threshold values. In some examples, the threshold values correspond to a voltage level, a current level, or other power characteristics. The controller 138 compares the voltage, current, etc., to a threshold value (e.g., associated with a welding operation, tool, etc.), and determines whether a response is appropriate, and at what level. In some examples, the threshold values can be stored in a memory associated with the power supply 106, the controller 138, etc. In response, the controller 138 can command the device 110 to adjust a current output to the drive rolls 114 to limit the current at the wire 116.

As shown in FIG. 1, the contact tip 120 is connected to a potential of the weld voltage (e.g., power source 132) via conductor 126. The work piece 108 is connected to an opposite potential at the power source 132, connected by clamp 128 via conductor 130. In some examples, the conductor 130 is a return pathway to a negative terminal of the power source 132, while in some examples the conductor 130 is attached to a ground. Adding a current limiting device 110 or, in some examples, a current limiting circuit, allows the system 100 to maintain the weld voltage on the wire 116 without allowing enough current flow to create an arc.

Moreover, in some examples, an operator can input commands, adjust parameters, provide welding tool and/or operation information, etc., into the power supply 106 via the operator interface 134.

Figure 2:
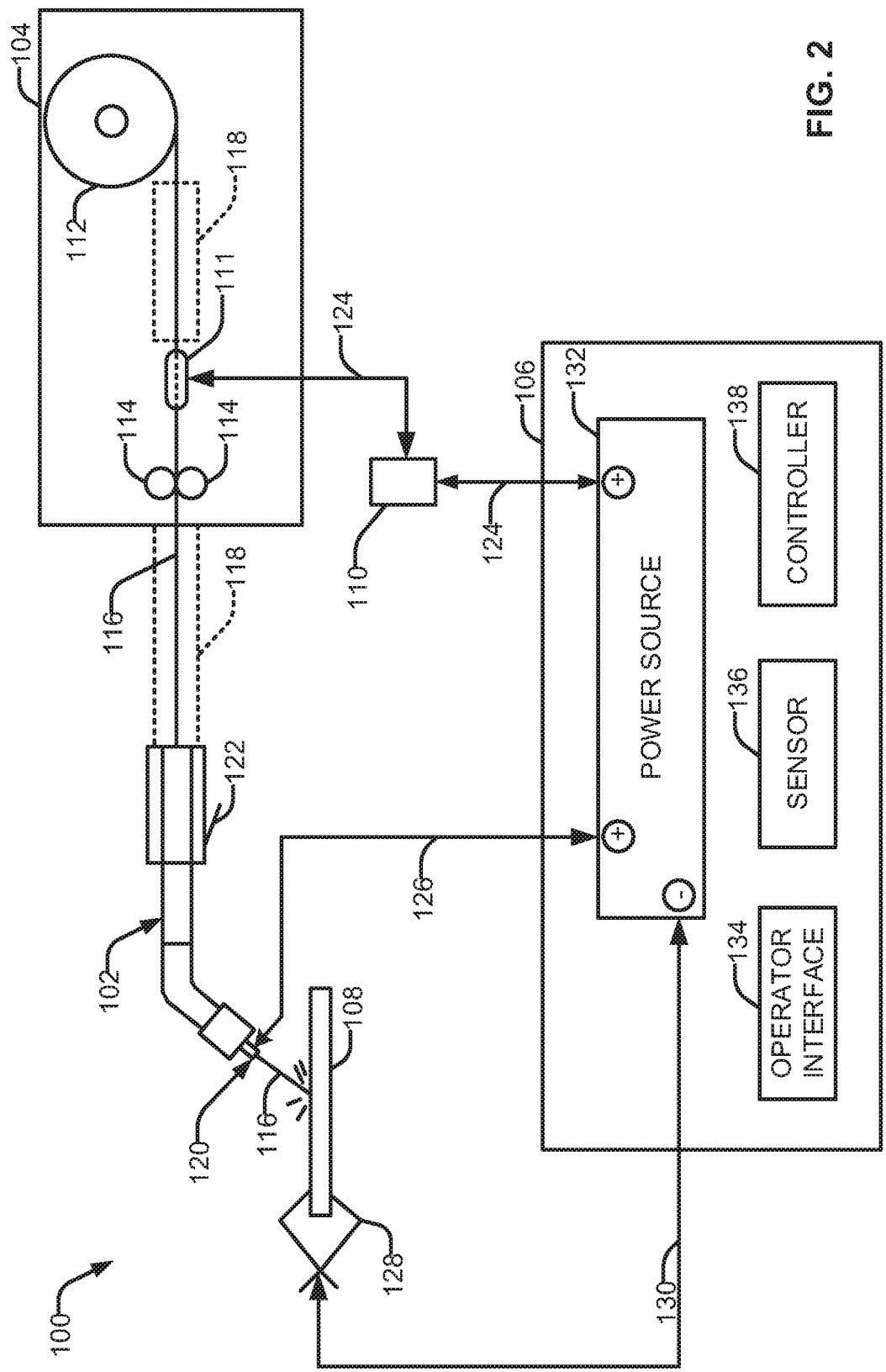
FIG. 2 depicts another example welding system employing a current limiting device, in accordance with aspects of this disclosure.

FIG. 2 illustrates an example welding system 100 employing current limiting device 110 with the secondary contact 111 arranged along the wire 116 between the spool 112 and the drive rolls 114. Although the figure illustrates a particular placement of the secondary contact 111, in some examples the secondary contact can be arranged at any location between the contact tip 120 and the spool 112. The secondary contact 111 can be any type of electrical conductor suitable to maintain contact with the wire 116 as it advances toward the workpiece 108. For instance, a bushing, pressure-biased contact, brush, and/or other suitable conductor can be employed.

Although the current limiting device 110 illustrated in FIG. 2 achieves a similar result as explained with respect to FIG. 1, the current limiting device 110 provides additional flexibility regarding placement of the secondary contact 111 along a path of the wire 116 towards the torch 102.

Figure 3:
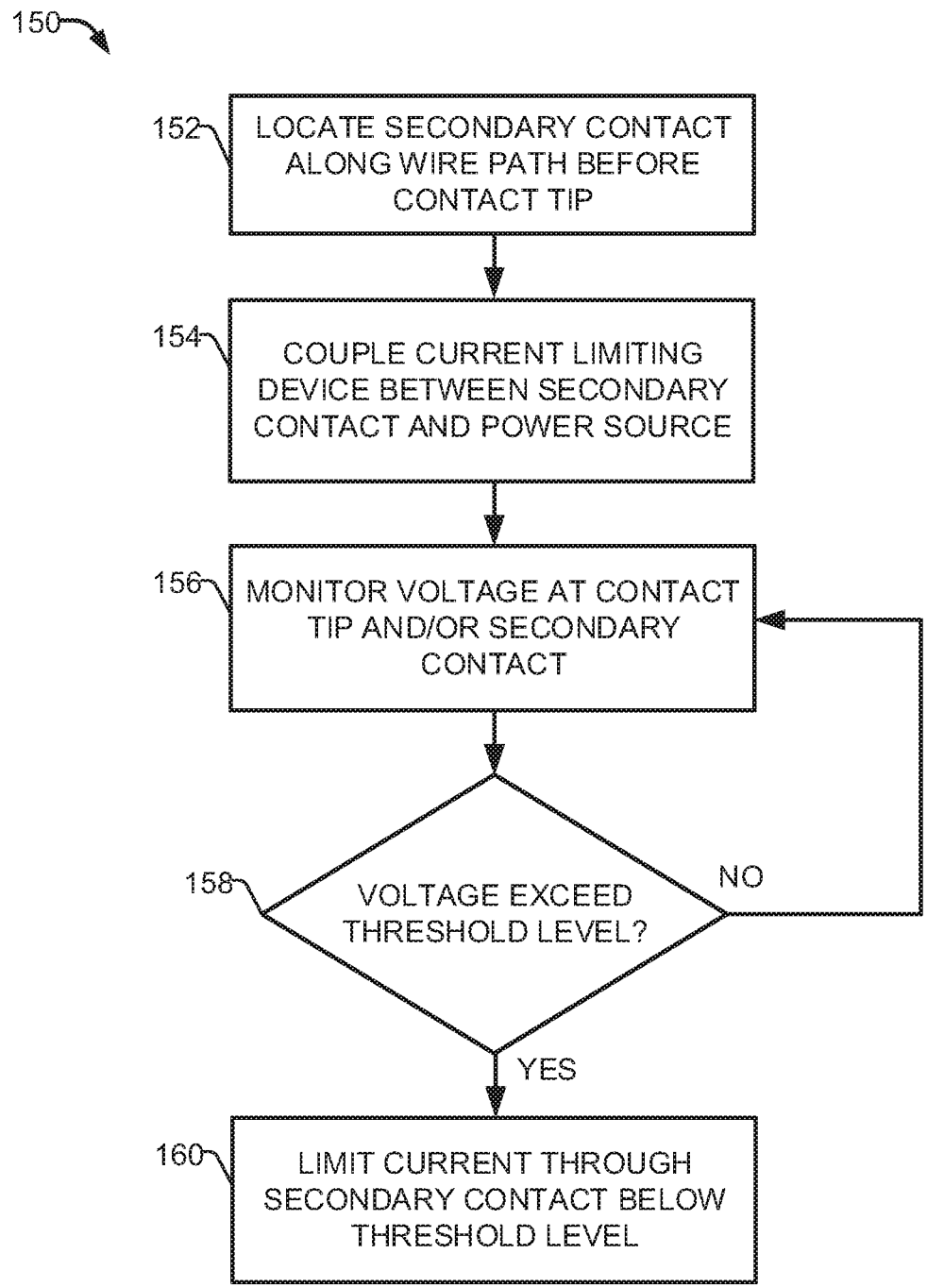
FIG. 3 illustrates an example method of operating a welding-type power system employing a current limiting device, in accordance with aspects of this disclosure.

FIG. 3 is a flowchart illustrating example method 150 of operating a welding-type system, for example, the welding-type system 100 of FIG. 1 and FIG. 2. The method 150 of FIG. 3 may be implemented by a controller (e.g., controller 138) by executing machine-readable instructions (e.g., algorithm, code, software, etc.), such as stored on a non-transitory machine-readable storage device.

At block 152 of method 150, a secondary contact (e.g., secondary contact 111) is located along a wire path (e.g., of wire 116) before a contact tip (e.g., contact tip 120). At block 154, a current limiting device (e.g., current limiting device 110) is coupled between the secondary contact and a power source (e.g., power source 138). At block 156, a voltage at the contact tip and/or the secondary contact is monitored.

At block 158, whether the voltage exceeds a threshold value is determined. This can be accomplished passively, such as by a resistor, capacitor, switches, transistors, etc., and/or via a controller (e.g., controller 138), such as with the use of a sensor (e.g., sensor 136). If the threshold value is not exceeded, the method returns to block 156 for continued monitoring. If the threshold value is exceeded, however, the method advances to block 130, where the current through the secondary contact is limited to a value below a threshold level. As disclosed herein, the current value can be set by a characteristic of the device (e.g., a resistance, capacitance, etc.), or subject to adjustment via the controller. In some examples, the system continues to monitor changes in power characteristics, and can adjust to fluctuations in the voltage, current, etc.

As described herein, an improved welding-type system is configured to maintain the voltage of the secondary contact at weld voltage, and the current through the secondary contact is automatically limited such that an arc does not occur on the secondary contact, even while changing the contact tip. This is achieved by including a current limiting device, such as a resistor, capacitor, diodes, etc., between the weld voltage and the secondary contact, which will improve system performance.

The present invention has been described in the terms of the preferred embodiment and it is recognized that equivalents, alternatives, and modifications, aside from those expressly stated, are possible and within the scope of the disclosure.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, circuitry is "operable" to perform a function whenever the circuitry comprises the necessary hardware and code (if any is necessary) to perform the function, regardless of whether performance of the function is disabled or not enabled (e.g., by a user-configurable setting, factory trim, etc.).

While the present systems and apparatuses have been described with reference to certain implementations, it will be understood by those skilled in the art that various changes may be made and equivalents may be substituted without departing from the scope of the present systems and apparatuses. In addition, many modifications may be made to adapt a particular situation or material to the teachings of the present disclosure without departing from its scope. For example, block and/or components of disclosed examples may be combined, divided, re-arranged, and/or otherwise modified. Therefore, it is intended that the present systems and apparatuses not be limited to the particular implementations disclosed, but that the present systems and apparatuses will include all implementations falling within the scope of the appended claims.

What is claimed is:

1. A welding-type system comprising:
   a welding torch comprising a contact tip to provide an electrode wire;

a secondary contact in electrical contact with the electrode wire, the secondary contact located along a length of the electrode wire and before the contact tip, wherein each of the contact tip and the secondary contact are connected to a welding-type power source; and a current limiting device coupling located between the welding-type power source and the secondary contact and configured to limit a current at the secondary contact.

2. The welding-type system of claim 1, wherein the current limiting device is configured to:

maintain a voltage at the secondary contact between a first and a second threshold voltage level based on a voltage associated with an output of the welding-type power source; and prevent the current at the secondary contact from exceeding a threshold current level.

3. The welding-type system of claim 1, wherein a voltage at the contact tip is equal to a voltage at the secondary contact.

4. The welding-type system of claim 1, wherein the current limiting device comprises a resistor.

5. The welding-type system of claim 1, wherein the current limiting device comprises a capacitor.

6. The welding-type system of claim 1, wherein the current limiting device comprises a transistor.

7. The welding-type system of claim 1, wherein the current limiting device comprises a circuit that includes a combination of at least two of a transistor, a resistor, a capacitor and a diode.

8. The welding-type system of claim 1, further comprising one or more drive rolls to advance the electrode wire.

9. The welding-type system of claim 8, wherein the secondary contact is located along a length of the electrode wire between the contact tip and the one or more drive rolls.

10. The welding-type system of claim 8, wherein the secondary contact is in electrical contact with the one or more drive rolls.

11. The welding-type system of claim 1, further comprising a liner to channel the electrode wire to the contact tip of a welding torch.

12. The welding-type system of claim 11, wherein the liner is non-conductive.

13. The welding-type system of claim 11, wherein the liner comprises a polymer.

14. The welding-type system of claim 1, wherein the electrode wire comprises aluminum.

15. The welding-type system of claim 1, wherein the contact tip is connected to the welding-type power source to create an arc between the electrode wire and a workpiece.

16. A welding-type system comprising:

one or more drive rolls to advance an electrode wire to a welding torch comprising a contact tip;

a secondary contact in electrical contact with the electrode wire via a drive roll of the one or more drive rolls, wherein each of the contact tip and the secondary contact are connected to a welding-type power source; and a current limiting device coupling located between the welding-type power source and the secondary contact and configured to limit a current at the secondary contact.

17. The welding-type system of claim 16, wherein the welding-type system is a wire feeder.

18. The welding-type system of 21, wherein the electrode wire comprises an aluminum consumable electrode wire.

19. The welding-type system of claim 16, further comprising a controller to maintain a voltage at the secondary contact between a first and a second threshold voltage level based on a voltage at the contact tip.

20. The welding-type system of claim 16, wherein the current limiting device comprises a circuit that includes one or more of a transistor, a resistor, a capacitor, or a diode.

* * * * *